Dec. 6, 1966 M. F. LAMORTE 3,290,539
PLANAR P-N JUNCTION LIGHT SOURCE WITH REFLECTOR
MEANS TO COLLIMATE THE EMITTED LIGHT
Filed Sept. 16, 1963 2 Sheets-Sheet 1

INVENTOR.
MICHAEL F. LAMORTE
BY J. C. Whittaker
Attorney

Dec. 6, 1966 M. F. LAMORTE 3,290,539

PLANAR P-N JUNCTION LIGHT SOURCE WITH REFLECTOR MEANS TO COLLIMATE THE EMITTED LIGHT

Filed Sept. 16, 1963 2 Sheets-Sheet 2

INVENTOR.
MICHAEL F. LAMORTE
BY J. C. Whittaker
Attorney 3,290,539

PLANAR P–N JUNCTION LIGHT SOURCE WITH REFLECTOR MEANS TO COLLIMATE THE EMITTED LIGHT

Michael F. Lamorte, Princeton, N.J., assignor to Radio Corporation of America, a corporation of Delaware
Filed Sept. 16, 1963, Ser. No. 309,062
7 Claims. (Cl. 313—114)

This invention relates to light emitters; in particular, this invention relates to P–N junction light emitters improved with respect to high average power and high peak power. The invention relates to light emitters operating in the incoherent as well as the coherent mode.

In the prior art there are several known types of P–N junction light emissive devices. These light emitters produce light by electron-hole recombination in the region of the P–N junction. To obtain high power from a conventional P–N junction light emitter, it has been suggested that the power input may be increased to provide a larger power output. This suggestion is useful for the low power ranges of light levels but is not useful, because operation occurs at substantially lower efficiencies, for high power light levels. The reason for this substantial decrease in efficiency is that, for high power levels, the greatest average current which may be passed through the junction without excessive heating is limited, for example, to approximately 10 amperes per sq. cm. Any higher average current densities result in increased heating rather than an increased magnitude of light output.

Another solution which has been proposed to increasing the power output of known P–N junction emitters is to increase the physical junction area. However, due to increased heating in large area junctions, the output radiation is not a linear function of the P–N junction surface area. Thus, junction areas greater than, for example, approximately 0.2 cm.$^2$ produce increased heating resulting in a reduction of the rate of increase in the light output.

It is an object of this invention to employ the edge emission rather than the P- and/or N-surface emission to obtain improved light emitters in the incoherent mode.

It is another object of this invention to provide a novel, high peak power, high efficiency junction light source.

It is another object of this invention to provide an improved, high average power P–N junction light emitter.

It is still a further object of this invention to provide an improved light source suitable for systems application in which the optical system is of modest size.

These and other objects are accomplished in accordance with this invention by providing a plurality of P–N junction light emissive devices or light emitters. The light emissive devices are constructed and operated so that light is emitted from each of the junctions substantially parallel to the plane of the P–N junctions or what is described as edge emission. Also provided is a light reflecting system for reflecting the emitted light into a path that is substantially perpendicular to the plane of the junctions. In one embodiment of the invention, the plurality of P–N junction light emitters are mesa junctions that are laterally spaced apart on one surface of a semiconducting body. In this embodiment each mesa junction may be partially surrounded by its own separate light reflector. This embodiment results in very high average power, with high efficiency, from the junction array light source. In another embodiment of the invention the P–N junctions are in a stacked array, with a contact electrode between each junction, and a single light reflector is positioned adjacent to the entire plurality of junctions to collimate or focus the light in a direction substantially perpendicular to the plane of the junctions. This embodiment is useful to efficiently obtain very high pulsed power output levels from the junction array light source.

The P–N junctions, in both embodiments, may be made of known light emitting materials such as suitable doped gallium arsenide or gallium phosphate semiconductive materials. Also in both embodiments, each of the plurality of P–N junctions are forward biased during operation. Furthermore, a means for cooling the plurality of P–N junctions may be used with either embodiment.

The invention will be described in greater detail by reference to the accompanying drawings in which.

Figure 1:
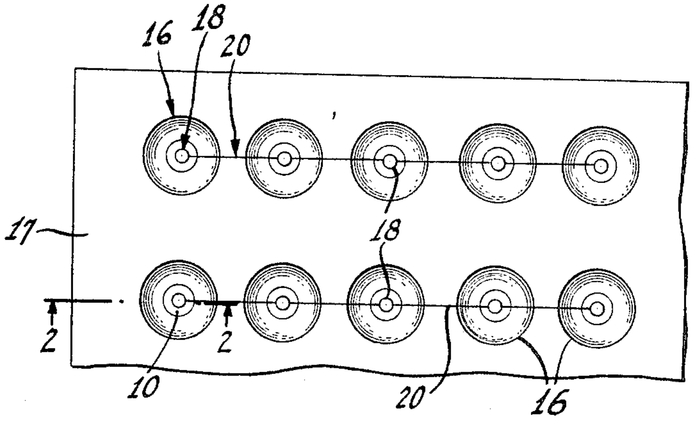
FIG. 1 is a partial top view of a plurality of mesa type light emissive devices or junctions arranged in accordance with one embodiment of this invention.
Figure 2:
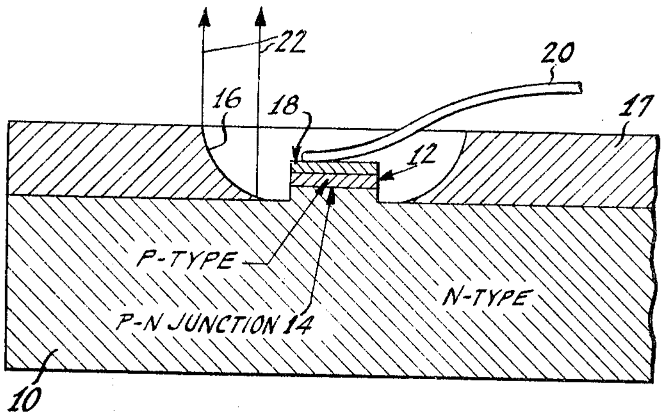
FIG. 2 is a partial sectional view taken along line 2—2 of FIG. 1.

Referring to FIGS. 1 and 2, a semiconductor body 10 is provided which may be any known semiconductor material. For simplicity of discussion it will be assumed that the semiconductor body 10 is made of gallium arsenide throughout the balance of the description. However, other, known, light emitting semi-conductor materials, and combinations thereof, such as gallium phosphide and gallium arsenide-gallium phosphide, respectively, may be used. For example, suitable proportions of gallium arsenide and gallium phosphide may be used to produce selected wavelengths of light.

The semiconductor body 10 is suitably doped to be of one conductivity type. In the example illustrated, the semi-conductive body 10 is N-type, which may be formed by doping gallium arsenide with appropriate amounts of silicon or tin. In the alternative the base or body 10 may be P-type. Spaced on the semiconductor body 10 are a plurality of P-type regions 12 which may be formed by suitably doping the gallium arsenide with appropriate amounts of zinc. Should the base or body 10 be P-type, the regions 12 would be N-type. The P-type regions 12 with the N-type support body 10 form a plurality of mesa P–N junctions 14.

The P–N junctions 14 are mesa junctions and may be fabricated by conventional methods or techniques such as diffusion followed by etching or, in the alternative, by suitable epitaxial methods. When desired, a suitable mask (not shown) may be used for positioning the mesa junctions 14. A spacing between mesa junctions, for example, of the order of approximately ten times the mesa diameter is suitable. As illustrated in FIG. 2, each of the P–N junctions 14 is raised above the surface of the N-type semiconductor body or base 10. Any desired number of P–N junctions may be formed on the support body 10. For example, as many as 1000 junctions, each approximately $10^{-4}$/cm.$^2$ in area, may be formed on a 1 cm.$^2$ area of the support body 10.

Surrounding each of the P–N junctions 14 is a light reflector 16 which may be any type of optical reflector such as a parabolic reflector. The light reflectors 16 are preferably made as the walls of apertures having the desired parabolic cross section (see FIG. 2), in a separate sheet 17 of light reflecting material, e.g. aluminum. The light reflectors 16 are each positioned in the separate sheet 17 in areas that register with one of the mesa P–N junctions 14. The positioning of the reflectors 16 may be provided by using any known techniques such as by using known photoresist techniques and materials on the sheet 17 and then using the previously formed array of P–N junctions as a light source for exposing the pattern in the photoresist. Then, by using known techniques the reflectors 16 may be formed and the registration between each of the plurality of reflectors and the plurality P–N junctions is assured. Also, a mask (not shown) which is a companion to the mask used for positioning the diodes may be used to position the light reflectors 16 in registration with the diodes. The reflector formation should be selective, e.g. by controlled etching, so that the proper cross section of each reflector is assured and so that the ratio of the diameter of the junction to the bottom aperture of its reflector is, for example, approximately 0.33. As an example, assuming that each P–N junction has a cross sectional area of $10^{-4}/\text{cm.}^2$, a suitable reflector dimension would be one having a small diameter of 0.033 cm. and a larger diameter of the order of .1 cm. in the example. The diameter is determined by the properties of the reflected radiation which is desired.

Positioned on top of each of the mesa P–N junctions 14 is a separate conducting member 18 which may be of material such as silver and lead. The metallic contact 18 may be deposited by known methods, such as evaporation, prior to etching, or after the epitaxial layer is deposited. A lead-in or energizing wire 20 is connected to each of the mesa junctions through its individual metallic contact 18. The energizing wires 20 may be connected in any desired series or parallel electrical combination. Thus, the semiconductor body 10 functions as one terminal for all of the mesa junctions 14 while each of the conductors 20 function as a different terminal for each of the junctions 14. The conductors 20 may be individually connected to a power distribution system (not shown) so that any desired light pattern or scene may be produced by energizing selected ones of the light emitting junctions 14.

For scene reproduction, the junctions 14 may be arranged in rows and columns. Then, after the sheet 17 is applied, the N-type base 10 may be etched or ruled between rows and the sheet 17 used as a support, or a separate support (not shown) may be used. When this is done, applying a potential difference between a row of N-type regions and a column of P-type regions will light only the junctions where the row and column cross. For scene reproduction, it will usually be desirable to select materials that reproduce visible wavelengths of light.

During operation of the light emitting device or light source illustrated in FIGS. 1 and 2, the junctions are forward biased by a suitable power source. The devices 14 each emit light of approximately 8500 A. wavelength (infrared). For small (e.g. .001 cm. sq.) area junctions in which a large fraction of the P- or N-surface is exposed, the infrared radiation becomes isotropic when the current density for each junction approaches approximately 800 amperes/cm.$^2$. At lower current densities the radiation observed is from the P- and/or N-surfaces and is lambertian. As the current density is increased, above the approximate level of 800 amperes/cm.$^2$, the radiation from the periphery or edge of the wafer, i.e. where the junction terminates, becomes comparable to the radiation from the P- or N-surfaces. It is this portion of the radiation which can be employed to obtain very large average powers from the P–N junctions 14. When the current density is increased further, the P–N junctions function as a laser and produce coherent radiation. The coherent laser radiation is also from the junction area and is emitted substantially parallel to the plane of the junction. Thus, the light emissive devices of this invention may produce either non-coherent radiation parallel to the plane of the junction, or coherent radiation parallel to the plane of the junction.

The light emitted by each mesa P–N junction is ultimately directed in a path substantially perpendicular to the plane of the junction by the reflecting surface 16. The light from each junction, which follows paths such as paths 22, is a collimated beam of electromagnetic radiation directed in a direction substantially perpendicular to the plane of the junction. As was previously stated, the light beam 22 may be non-coherent or coherent radiation.

The P–N junctions may all be energized together to provide a high efficiency, high power light source. For example, consider an area of one square cm. in which there are 1000 mesa P–N junctions each of 0.001 sq. cm. in area. Since at least 0.14 ampere may be passed through each junction without excessively heating the junctions, the total power that may be radiated by such a structure is approximately 4 watts when the ratio of the output power in watts to the input current in amperes is 30 milliwatts per ampere. If desired, the conductors 20 may be connected to individual light emissive cells so that a desired optical pattern or scene may be produced.

Figure 3:
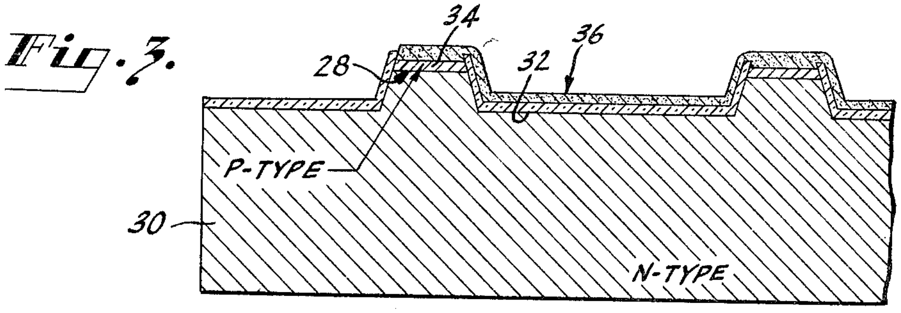
FIG. 3 is a partial sectional view of a modification of this invention.

Referring to FIG. 3, a plurality of mesa junctions 28 are provided on a base or support member 30, Deposited on the base member 30, between all of the junctions 28, and actually over the junction as shown in FIG. 3, is an electrical insulator and anti-reflection coating 32. The anti-reflection coating 32 may be made of any electrically insulating material which is transparent to the wavelength emitted by the junctions, such as silicon oxide or silicon dioxide. Deposited on all of the P-type areas 34 is an evaporated interconnection conductor 36. The electrically insulating layer 32 electrically isolates the conductor 36 from the N-type base 30. Therefore the interconnection conductors 36 may be made by a process such as evaporation. Also, insulating material, not shown, may be deposited over selected crossover points. This technique for depositing the conductors 36, in any desired pattern or sequence, is readily adapted to mass producing light emissive devices including large pluralities of mesa junctions.

The light reflecting member (not shown in FIG. 3), with the light reflectors in registering location around each junction, is then positioned on the N-type base with its mesa junctions to direct the light in a path substantially perpendicular to the plane of the junction. The materials used in the modification illustrated in FIG. 3 may be similar to those previously described.

Figure 4:
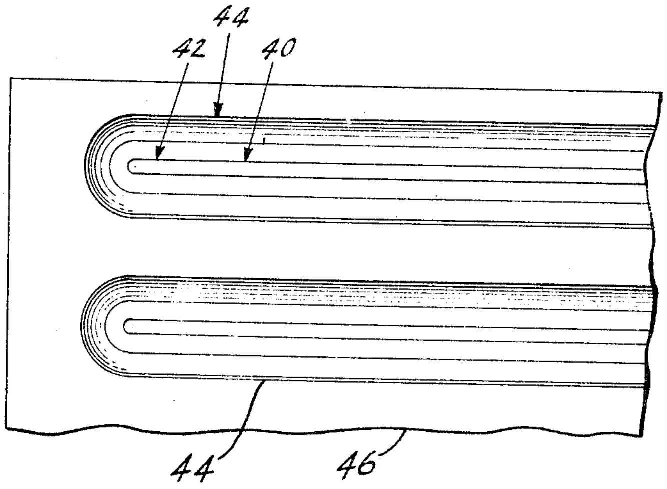
FIG. 4 is a partial top view of a further modification of this invention.

Another modification of this invention is shown in FIG. 4 wherein line like, mesa P–N junctions 40 are used. The line P–N junctions 40 may be made less than 1 mil wide and can be formed by any of the known techniques discussed above, e.g. by diffusion and etching. A single metallic contact 42 is deposited, e.g. by evaporation, on each P-type layer (not shown in cross section) to contact each of the line junctions 40. This structure provides simplification of the fabrication technique of the light emissive devices. The reflector 44, which may be substantially parabolic in cross section or other desired shape of light reflector, is also a line like structure in the member 46 to reflect the light in a path substantially perpendicular to the plane of the P–N junctions. When desired, the line like junctions 40 may be of any desired configuration. As an example, the junctions may be arranged in an alpha-numeric array to display selected information when selected ones of the junctions are energized. If desired, insulating material may be deposited, for example by evaporation, to insulate one metallic contact 42 from another.

Figure 5:
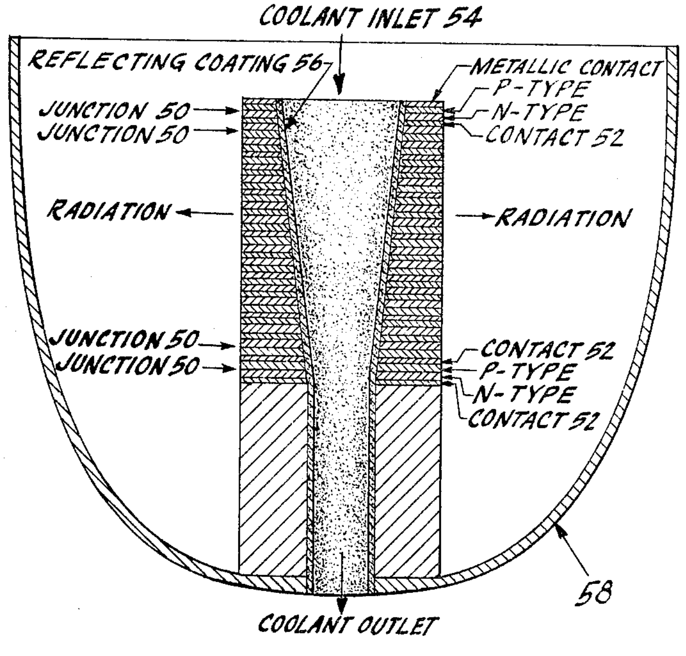
FIG. 5 is a side view of an embodiment of this invention utilizing a stacked array of P–N junctions forming a single light emissive device.

The mesa structures that have been described are particularly useful for producing very high average power and high light emission efficiency for either coherent or non-coherent emission. The structures described may be cooled by any known cooling medium (not shown), for example liquid nitrogen, water, or cooled air. The embodiment to be described in connection with FIG. 5 is particularly useful for obtaining very high pulse power of either coherent or non-coherent emission. In FIG. 5, a plurality of P–N junctions 50 are positioned in a vertically stacked array with a separate metallic contact 52 between each of the P–N junctions 50. The materials used for the P–N junctions 50 and the methods of manufacturing the junctions may be similar to the light emitting semiconductor materials and methods previously described. The metallic contacts 52 may be evaporated or may comprise pre-formed alloy discs, and may be formed of any electrically conductive material such as nickel. Alternate and intermediate ones of the metallic contacts 52 are connected together and across a suitable source of a pulsed power supply to forward bias all of the junctions.

The structure shown in FIG. 5 is that of annular shaped P–N junction pellets and with annular shaped metallic contacts positioned between junctions. However, other geometrics of junctions and conductors, such as squares or rectangles, may also be employed. The annular arrangement shown is useful when it is desired to circulate a cooling medium through the center of the device 54. Under these circumstances, the inner surface 54 may have an electrically insulating, reflecting coating 56 positioned thereon to reflect light from the inner edge of the junctions 50. The light reflecting coating 56 may be made of a material such as silver or aluminum, for example.

In the alternative, the light reflecting coating 56 may be omitted from the inner surface, and applied to the outer surface (not shown), and a light responsive member, e.g. an optically pumped laser (not shown) may be positioned in the aperture 54. When this is done, it may be desirable to circulate a cooling medium around the stacked junctions. Also, if the cooling medium is transparent. It may be circulated between the laser and the inner surface of the stacked junctions.

A light reflector 58 is provided which partially surrounds all of the P–N junctions 50. The light reflector 58 may be made of any good light reflecting material, such as aluminum, and may be of any desired optical shape, such as parabolic. The light reflector 58 is designed so that light from all of the junctions 50, which is emitted parallel to the plane of the junctions, is collimated and directed in a direction that is perpendicular to the plane of the junctions.

During operation of the embodiment shown in FIG. 5, a very high pulsed power output may be obtained by simultaneously forward biasing all of the P–N junctions 50 with a suitable source of a pulsed power supply.

What is claimed is:

1. A light source comprising a P–N junction, and a reflector around said P–N junction, said P–N junction being planar and adapted to emit light in the plane of said P–N junction when said P–N junction is forward biased with a predetermined voltage, and said reflector being disposed to reflect said light substantially perpendicularly to said plane.

2. A plurality of light emitting P–N junctions, a plurality of light reflectors, each of said light reflectors being around a different one of said P–N junctions, each of said P–N junctions being planar and adapted to emit light in the plane of said P–N junction when said P–N junction is forward biased with a predetermined voltage, and each of said reflectors being disposed to reflect light from a separate one of said P–N junctions substantially perpendicularly thereto.

3. A plurality of planar light emitting P–N junctions, said P–N junctions being positioned mutually parallel in a stacked relationship, and a parabolic light reflector positioned around said P–N junctions, said reflector having an axis disposed substantially perpendicular to said P–N junctions.

4. A plurality of light emitting planar P–N junctions, a plurality of metallic contacts, one of said contacts being positioned between each of said P–N junctions in a parallel stacked relationship, means for forward biasing all of said P–N junctions whereby light is emitted from the edge of said P–N junctions, and a parabolic reflector positioned around said junctions to receive said light from all of said junctions and to collimate said light.

5. A plurality of annular P–N junctions, a plurality of annular metallic contacts, said contacts and said P–N junctions being in a stacked array with one contact positioned between each of said P–N junctions, a light reflecting coating on the inner surface of said stacked array, means for circulating a cooling medium through said inner surface, said stacked array being positioned in a parabolic reflector whereby light from all of said junctions is collimated, and means for forward biasing all of said junctions.

6. A body of semiconductive material, a plurality of mesa type P–N junctions formed adjacent one surface of said semiconductive material, each of said P–N junctions defining a plane, means for applying electrical energy to each of said P–N junctions whereby light is emitted from the edge of each of said junctions, at least some of said light being in the planes of said P–N junctions, a plurality of light reflectors, each of said reflectors having an axis and being positioned adjacent to one of said junctions whereby light from said junctions is directed substantially parallel to the axes of said reflectors and into a path substantially perpendicular to said P–N junctions.

7. A sheet of semiconductive material, a plurality of mesa type light emitting P–N junctions adjacent one surface of said sheet, said sheet of semiconductive material comprising one terminal for all of said junctions, a plurality of light reflectors each having an axis and positioned adjacent to a different one of said P–N junctions, each of said P–N junctions defining a plane and adapted to emit light in said plane when forward biased with a predetermined voltage, and said reflectors being disposed so that light emitted from the edges of said junctions is directed in a path substantially perpendicular to said P–N junctions.

References Cited by the Examiner

UNITED STATES PATENTS

| | | | |
|---|---|---|---|
| 2,771,382 | 11/1956 | Fuller | 317—235 |
| 2,919,299 | 12/1959 | Paradise | 317—234 |
| 3,100,276 | 8/1963 | Meyer | 317—234 |
| 3,110,806 | 11/1963 | Denny et al. | 317—234 |
| 3,133,336 | 5/1964 | Marinace | 317—234 |
| 3,134,906 | 5/1964 | Henker | 250—211 |
| 3,165,811 | 1/1965 | Kleimack et al. | 317—235 |

JAMES W. LAWRENCE, *Primary Examiner.*

R. JUDD, *Assistant Examiner.*